(12) United States Patent
Aljubran et al.

(10) Patent No.: US 12,019,426 B2
(45) Date of Patent: Jun. 25, 2024

(54) ONLINE DATA-DRIVEN OPTIMIZER OF ROTATING CONTROL DEVICE USED IN CLOSED LOOP DRILLING

(71) Applicant: SAUDI ARABIAN OIL COMPANY, Dhahran (SA)

(72) Inventors: Mohammad Aljubran, Sayhat (SA); Zahrah Marhoon, Safwa (SA); Arturo Magana-Mora, Dhahran (SA); Amjad Shaarawi, Al Khobar (SA); Ossama Sehsah, Dhahran (SA); Hassan Malik, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/662,934

(22) Filed: May 11, 2022

(65) Prior Publication Data
US 2023/0367290 A1 Nov. 16, 2023

(51) Int. Cl.
*E21B 44/00* (2006.01)
*E21B 44/04* (2006.01)
*G05B 19/4155* (2006.01)

(52) U.S. Cl.
CPC .......... *G05B 19/4155* (2013.01); *E21B 44/00* (2013.01); *E21B 44/04* (2013.01); *G05B 2219/41109* (2013.01)

(58) Field of Classification Search
None
See application file for complete search history.

(56) References Cited

U.S. PATENT DOCUMENTS

| 8,274,399 B2 | 9/2012 | Strachan et al. | |
| 10,081,985 B2 | 9/2018 | Bullock | |
| 2015/0337599 A1* | 11/2015 | Bullock | E21B 47/007 |
| | | | 702/9 |
| 2018/0245444 A1 | 8/2018 | Hardt et al. | |
| 2019/0345809 A1* | 11/2019 | Jain | E21B 47/26 |
| 2020/0190958 A1* | 6/2020 | Wessling | E21B 44/00 |
| 2021/0108500 A1* | 4/2021 | Venugopal | G06N 20/00 |

FOREIGN PATENT DOCUMENTS

| CN | 101868595 B | 9/2014 |
| WO | 2014105305 A1 | 7/2014 |
| WO | 2015060836 A1 | 4/2015 |
| WO | 2020104856 A1 | 5/2020 |
| WO | 2020231441 A1 | 11/2020 |
| WO | 2021006896 A1 | 1/2021 |

* cited by examiner

*Primary Examiner* — Kristyn A Hall
(74) *Attorney, Agent, or Firm* — Osha Bergman Watanabe & Burton LLP

(57) ABSTRACT

A method for a well includes obtaining a dynamic input parameter combination for the well, determining measurements for a rotating control device using a sensor, and predicting a rotating control device wear estimate using rotating control device estimation methods, the measurements, and the dynamic input parameter combination. The method for a well further includes maximizing an instantaneous rate of penetration, while reducing rotating control device failure, to determine an optimized average rate of penetration using the rotating control device wear estimate. Finally, the optimized average rate of penetration is executed for a well.

14 Claims, 5 Drawing Sheets

ONLINE DATA-DRIVEN OPTIMIZER OF ROTATING CONTROL DEVICE USED IN CLOSED LOOP DRILLING

BACKGROUND

In the petroleum industry, hydrocarbons are located in reservoirs far beneath the Earth's surface. Wells are drilled into these reservoirs to access and produce the hydrocarbons. Wells are structures that include casing strings, cement, and various production equipment. There are many different drilling methods, such as conventional drilling, unconventional drilling, etc., that may be used to recover hydrocarbons most effectively. A closed-loop (CL) drilling operation (DO) is a type of unconventional drilling technique (UDT) where the returning fluid from the well is not exposed directly to the atmosphere like in a conventional drilling operation.

The mud flow loop in a CLDO includes conventional rig equipment along with additional equipment that is used to keep the flow loop under pressure. Conventional drilling is an overbalanced pressure operation meaning the pressure of the drilling fluid inside the wellbore is higher than the formation pressure. As such, no surface pressure exists in a conventional open loop system. However, in the case of a CLUDT, the wellbore pressure, under static conditions, is lower than the formation pressure. As such, CLUDTs are kept under pressure using additional equipment at the surface in order to keep the well slightly overbalanced and avoid any invasion of hydrocarbons from the formation into the wellbore.

CLUDTs often include a rotating control device (RCD) designed to maintain a seal around the drill pipe in order to divert the returning fluid from the well to an enclosed loop. In a way, the RCD works as an operational barrier in nearly all CLUDTs. If the RCD fails, it can cause non-productive time for a well. In drilling operations, the speed at which a drilling bit breaks the rock to lengthen the wellbore is called rate of penetration (ROP). The average ROP represents the average time required to lengthen the wellbore within a given section of a well. The average ROP is maximized by maximizing the instantaneous ROP while minimizing non-productive time caused, in part, by RCD failure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for a well. This method includes obtaining a dynamic input parameter combination for the well, determining measurements for a rotating control device using a sensor, and predicting a rotating control device wear estimate using rotating control device estimation methods, the measurements, and the dynamic input parameter combination. The method for a well further includes maximizing an instantaneous rate of penetration, while reducing rotating control device failure, to determine an optimized average rate of penetration using the rotating control device wear estimate. Finally, the optimized average rate of penetration is executed for a well.

In general, in one aspect, embodiments relate to a non-transitory computer readable medium storing instructions executable by a computer processor, the instructions including functionality for obtaining a dynamic input parameter combination for the well, determining measurements for a rotating control device using a sensor, and predicting a rotating control device wear estimate using rotating control device estimation methods, the measurements, and the dynamic input parameter combination. The instructions also include the functionality for maximizing an instantaneous rate of penetration, while reducing rotating control device failure, to determine an optimized average rate of penetration using the rotating control device wear estimate and execute the average rate of penetration for a well.

A method for a well includes obtaining a dynamic input parameter combination for the well, determining measurements for a rotating control device using a sensor, and predicting a rotating control device wear estimate using rotating control device estimation methods, the measurements, and the dynamic input parameter combination. A method for a well further includes maximizing an instantaneous rate of penetration, while reducing rotating control device failure, to determine an optimized average rate of penetration using the rotating control device wear estimate. Finally, the optimized average rate of penetration is executed for a well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The embodiments disclosed herein describe methods for a well, optimizing the average rate of penetration (ROP) with respect to minimizing rotating control device (RCD) equipment failure. The methods include predicting an RCD wear estimate using the wells dynamic input parameter combination and measurements for the RCD using a sensor. The method then describes defining an optimization problem having an objective function that is an optimum output parameter combination. The optimization problem is solved using a derivative-free optimization solver. The optimum output parameter combination, when implemented in the drilling operation, will yield the maximized average rate of penetration (ROP), with respect to minimizing RCD equipment failure.

Figure 1:
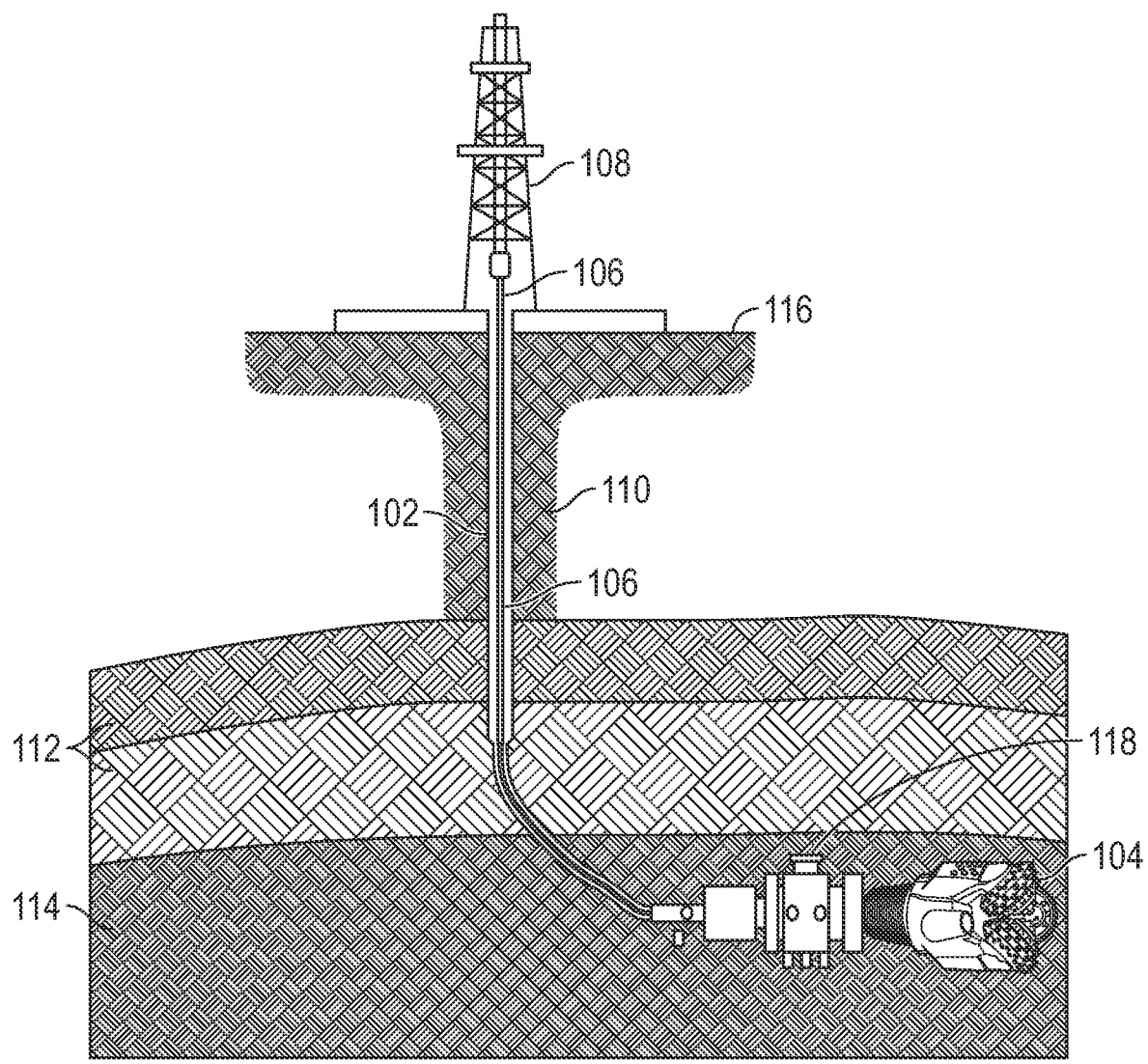
FIG. 1 shows a system in accordance with one or more embodiments.

FIG. 1 illustrates a system in accordance with one or more embodiments. As shown in FIG. 1, a well (102) may be drilled by a drill bit (104) attached by a drill pipe (106) to a drill rig (108) located on the Earth's surface (116). The well (102) may traverse a plurality of overburden layers (110) and one or more cap-rock layers (112) to a hydrocarbon reservoir (114). In accordance with one or more embodiments, the system in FIG. 1 may include CLUDTs using a rotating control device (RCD) (118) disposed around a drill pipe (106). RCDs (118) may be deployed in CLUDTs for sections of the well that may require underbalanced drilling (UBD) or managed pressure drilling.

Figure 2:
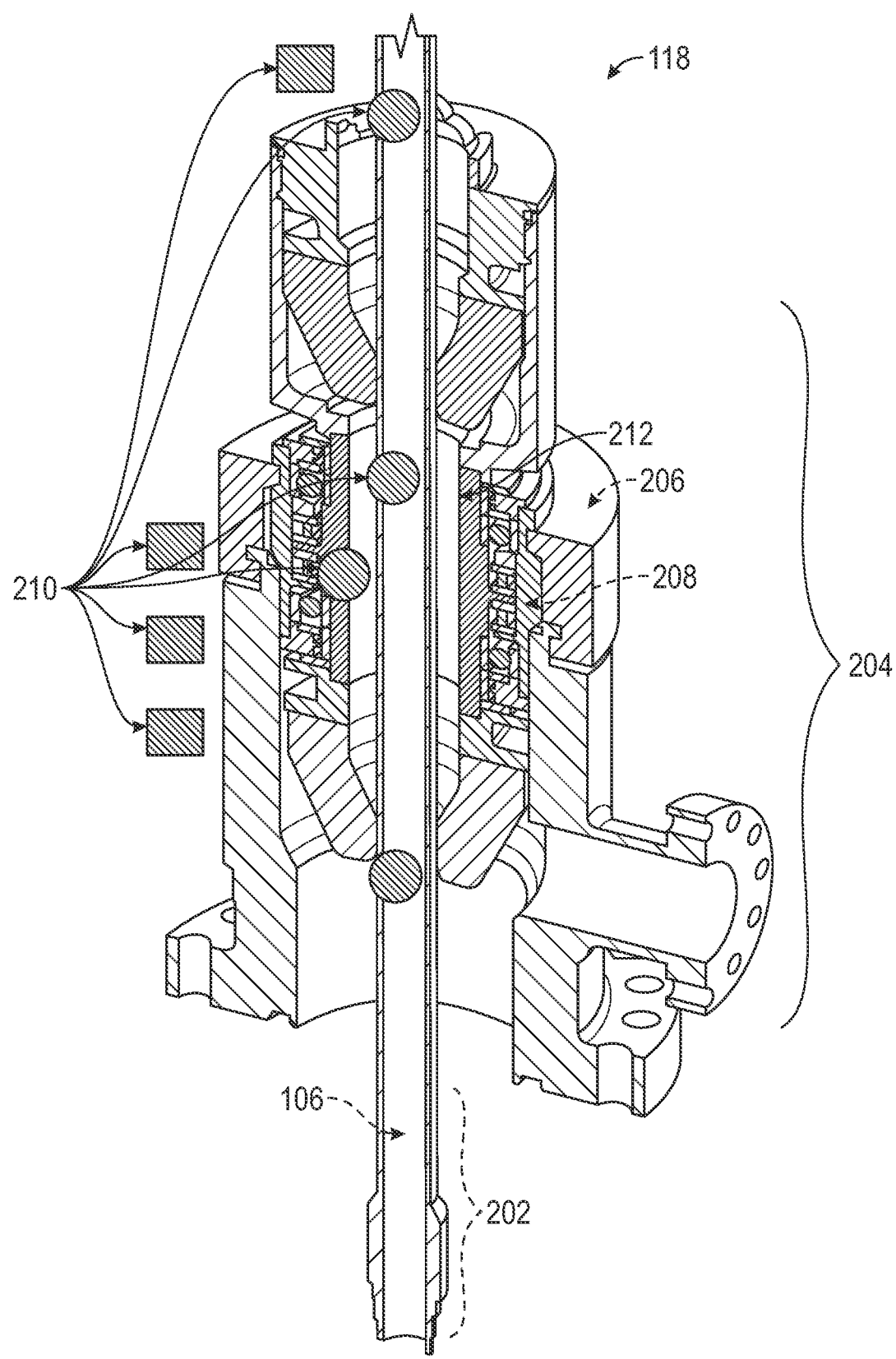
FIG. 2 shows a rotating control device with sensors in accordance with one or more embodiments.

FIG. 2 further illustrates an RCD (118) in accordance with one or more embodiments. The RCD (118) is used to form a pressure seal around the drill pipe (106) in a wellbore (202). The pressure seal isolates wellbore fluids and maintains a constant bottomhole pressure. The RCD (118) may include a housing (204) that creates a stationary connection to the drill pipe (106) using a latch mechanism (206). The housing (204) further includes an element (212) that seals around and rotates with the drill pipe (106). The RCD (118) may also include bearings (208) which enable rotation within the housing (204). Other sealing elements may be mounted on and rotate with the drill pipe (106). While FIG. 2 shows an RCD (118) having a specific design, any RCD (118) may be used without departing from the scope of this disclosure herein.

The RCD (118) may have one or more sensors (210). The sensors (210) may be smart and waterproof. Further, the sensors (210) may have high-resolution and may monitor the condition of the RCD (118) components. The sensors (210) may measure pipe eccentricity, rotation, housing temperature, coolant temperature, pressure, noise, vibration, erosion, image, and video among others. The sensors (210) may be mechanical, electrical, magnetic, acoustic, and optical, among others.

The measurements from the sensors (210) may provide an indication of the condition of the RCD (118) components and may be used to form an RCD (118) wear estimate. Failure of the RCD (118) components, such as the seals or bearings (208), may result in potential hazards for the well (102). Potential hazards may include high background gas which may lead to severe slugging, a kick, or drilling fluid losses into the formation. These hazards may create health and safety risks and non-productive time.

Figure 3:
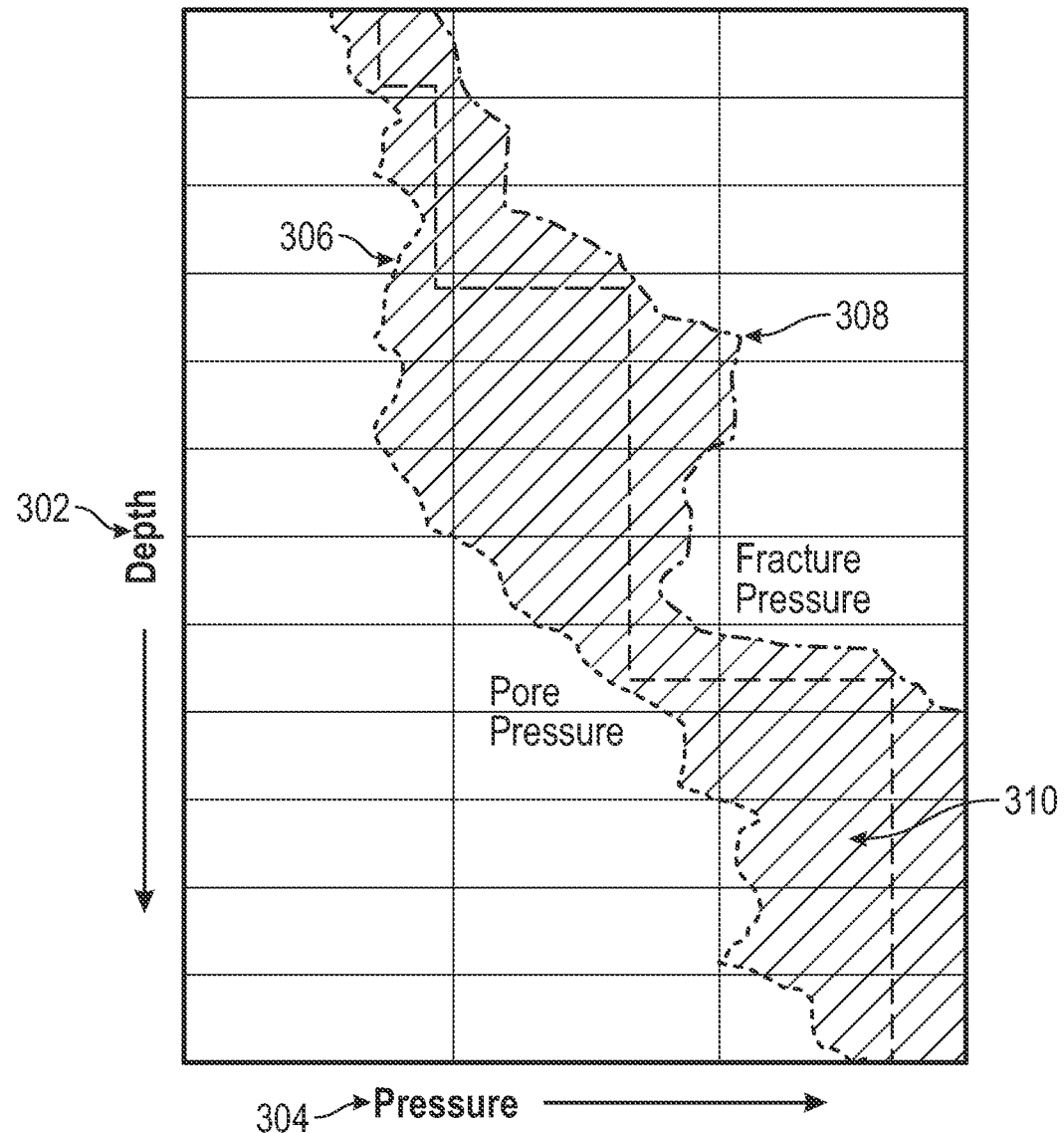
FIG. 3 shows an example of a drilling window in accordance with one or more embodiments.

FIG. 3 shows a drilling window (310). The drilling window is a drillable pressure profile a drilling operation must maintain for safe drilling. To eliminate kick and lost circulation potential, the bottomhole pressure must be higher than the formation pore pressure (306) and lower than the formation fracture pressure (308). For drilling operations that have a narrow drilling window, the use of an RCD (118) provides surface pressure to maintain the bottomhole pressure within the drilling window (310). The formation fracture pressure (308) and formation pore pressure (306) may be estimated using reservoir modeling. However, CLUDTs often have narrow drilling windows (310) and require more accurate measurements to operate within the narrow drilling windows (310).

The formation fracture pressure (308) may be determined by increasing the bottomhole pressure until the drilling fluid flow pump, or Q(in), is higher than the drilling fluid flow out rate, or Q(out). In other words, the flow rate coming from a drill rig (108) pump into the wellbore (202) is higher than the flow rate from the wellbore annulus into the return lines and mud tanks. The formation pore pressure (306) may be determined by decreasing the bottomhole pressure until the Q(in) rate is lower than the Q(out) rate. This may be done anytime and multiple times during a drilling operation. This is commonly referred to as a Formation Integrity Test (FIT) and a pore-pressure/mini-well test, respectively.

The drilling window (310) in FIG. 3 shows pressure increasing left to right on the horizontal axis (304) and depth increasing down the vertical axis (302). The formation pore pressure (306) represents the minimum threshold for bottomhole pressure. The formation fracture pressure (308) represents the maximum threshold for bottomhole pressure. The wellbore (202) failure or collapse pressure may be used as the lower boundary in the case where the failure or collapse pressure is higher than the formation pore pressure (306).

The drilling window (310) represents the bottomhole pressure range necessary to eliminate kick and lost circulation events. The RCD (118) is a pivotal member of the closed loop pressure control operation for a well (102), as it allows for providing surface pressure to maintain the bottomhole pressure within this drilling window (310). Returned effluents of the well (102) are diverted by RCD (118) equipment to a choke manifold to allow for pressure control and flow measurements. Ensuring the longevity of the RCD (118) is crucial to being able to eliminate kick and lost circulation events, thus reducing the non-productive time of a drilling operating and ultimately maximizing the average ROP.

Figure 4:
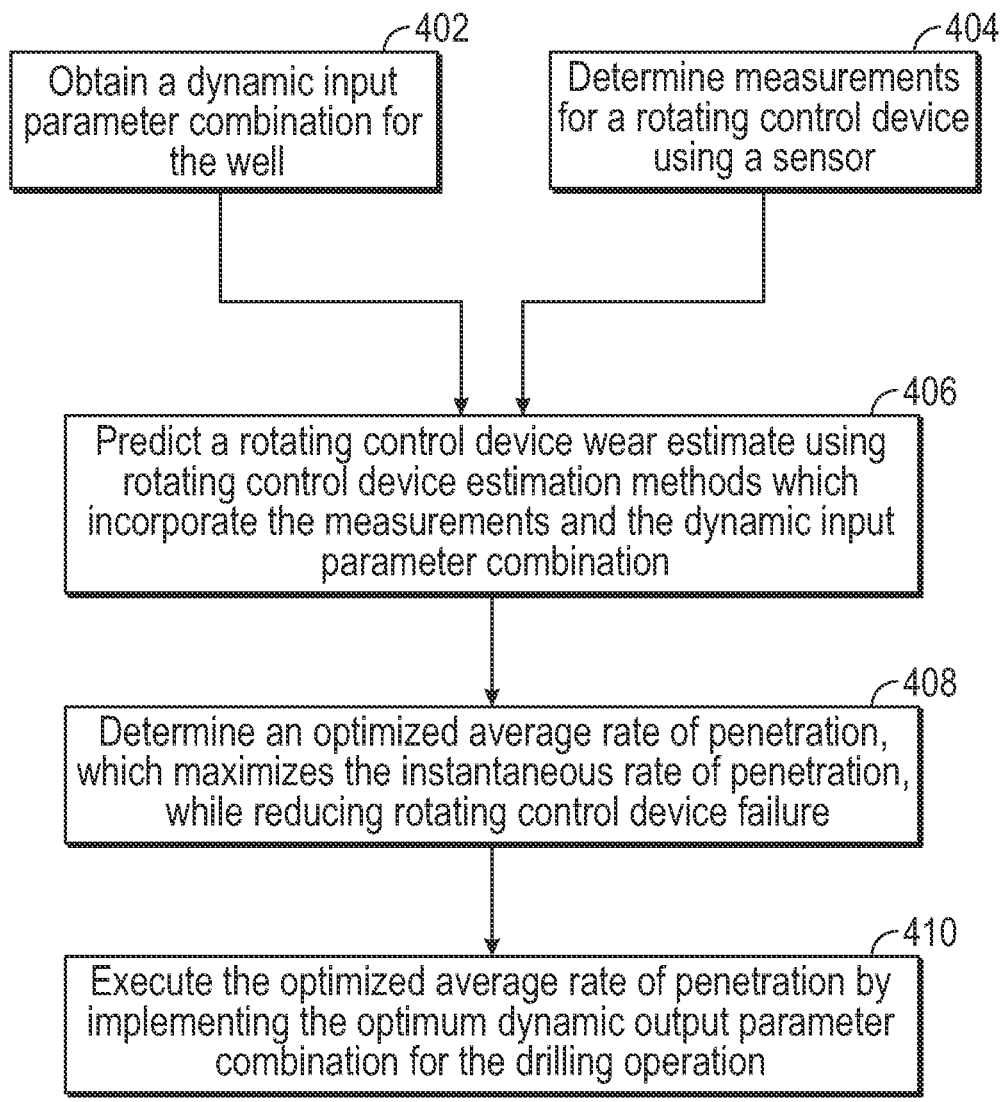
FIG. 4 shows a flowchart in accordance with one or more embodiments.

FIG. 4 shows a flowchart in accordance with one or more embodiments. The flowchart outlines a method for optimizing the average ROP while limiting RCD (118) wear. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Step 402, and in accordance with one or more embodiments, a dynamic input parameter combination is obtained. The average ROP for a well (102) depends on multiple static and dynamic parameters. The dynamic input parameter combination for the well (102) comprises selecting two or more parameters from a list comprising: weight on bit (WOB), rotary speed (RPM), pump flow rate (GPM), torque, standpipe pressure, mud properties, formation lithology, hole size, drilling bit design, bottom-hole assembly, drilling mud type, and offset well parameters. Traditionally, drillers are in charge of manually adjusting the dynamic parameters to achieve the highest average rate of penetration possible.

In Step 404, and in accordance with one or more embodiments, measurements for the RCD (118) are obtained using a sensor (210). One or more smart, waterproof, and high-resolution sensors (210) monitor the condition of the RCD (118) components. These sensors (210) may be located on the exterior, interior or in proximation of the RCD (118). As previously discussed, in FIG. 2, these sensors (210) may measure properties of the RCD (118) including pipe eccentricity, rotation, housing temperature, coolant temperature, pressure, noise, vibration, erosion, image, and video. These sensors (210) may be mechanical, electrical, magnetic, acoustic, and optical. The measurements from the sensors (210) are obtained in real-time and give an indication of the condition of the RCD (118) components and will later be used to form an RCD (118) wear estimate. A worn or damaged RCD (118) has the potential to cause costly non-productive time for a well (102).

In Step 406, and in accordance with one or more embodiments, an RCD (118) wear estimate is predicted using RCD (118) estimation methods which incorporate the measurements and the dynamic input parameter combination. Both static and dynamic parameters form the basis to estimate the wear level and rate, hence longevity, of RCD (118) equipment (e.g., seal and bearing). The RCD (118) wear estimate will be based on which RCD (118) equipment are most likely to fail first. The estimation method uses a combined physics-based and data-driven algorithms to estimate the RCD (118) operational life (or wear) based on the real-time measurements of the RCD (118) monitoring sensors (210) and the dynamic input parameter combination.

The drilling operation is in continuous change. An RCD (118) wear estimate may be estimated in real-time, continuously throughout the drilling operation to capture the changing conditions. These RCD (118) wear estimation algorithms re included in the multi-objective optimization solver to capture the changing conditions that a well (102) may face in real-time. Furthermore, the RCD (118) estimate may be obtained through machine learning (ML) and deep learning (DL) algorithms to develop surrogates (proxy models) which feed on the observed measurements to forecast the RCD (118) equipment life. The surrogate-based optimization method using ML or DL proxies is further described in FIG. 5.

In Step 408, and in accordance with one or more embodiments, an optimized average ROP, which maximizes the instantaneous ROP while reducing RCD (118) failure, is determined. The dynamic input parameter combination, one or more measurements from the sensors (210), and an RCD (118) wear estimation algorithm, are fed into multi-objective optimization solver to optimize the average ROP.

The objective function is controlled using a specific dynamic input parameter combination of weight on bit (WOB), rotary speed or revolutions per minute (RPM), and pump flow rate expressed in gallons per minute (GPM). These parameters are controllable for the wellsite, therefore solving for an objective function would be to solve for an optimum dynamic output parameter combination that would yield the optimized average ROP subject to different operational constraints. Other parameters from the dynamic input parameter combination may also be included without any significant deviation to the proposed algorithm.

To determine the optimum dynamic output parameter combination, which gives the optimized average ROP, in step 408, it is important to formally define this temporal and continuous optimization problem as follows:

$$\max_x f(x, y) \qquad \text{Equation (1)}$$

subject to $$g_i(x, y) \le C_{g_i}(x, y), \quad i = 1, \ldots, m$$
$$h_j(x, y) = C_{h_j}(x, y), \quad j = 1, \ldots, p$$

$x \in \mathbb{R}^n$: n-dimensional temporal vector of the controllable input parameters, $n \in \mathbb{N}$ $y \in \mathbb{R}^l$: l-dimensional temporal vector of the non-controllable measurements, e.g., static data, components specifications, etc., $l \in \mathbb{N}$ $f(x, y) \in \mathbb{R}$: objective function to be optimized $g_i(x, y) \le C_{g_i}(x, y)$: inequality constraints, where $g_i(x, y) \in \mathbb{R}$ is a sensor measurement, a physics-based or machine learning algorithm that evaluates the state of a drilling aspect (e.g. hole cleaning, vibrations, etc.) while $C_{g_i}(x, y) \in \mathbb{R}$ describes the corresponding inequality constraint $h_j(x, y) = C_{h_j}(x, y)$: equality constraints, where $h_j(x) \in \mathbb{R}$ is sensor measurement, a physics-based or machine learning algorithm that evaluates the state of a drilling aspect (e.g. hole cleaning, vibrations, etc.) $C_{h_j}(x, y) \in \mathbb{R}$ describes the corresponding equality constraint $m \in \mathbb{N}$: number of inequality constraints $p \in \mathbb{N}$: number of equality constraints Where $\mathbb{R}$ and $\mathbb{N}$ represent real and natural numbers, respectively.

ROP, RCD (118) wear, and the dynamic input parameter combination represent constraints in continuous optimization problem above. The relationship between these constraints is unknown however, so the optimization may be posed as a blackbox optimization. Blackbox optimizations are typically used where the objective and/or the constraints are unavailable, unreliable, or impractical to obtain.

The optimization is an iterative process where the optimization algorithm or solver for the objective function, aims to find the optimal combination of dynamic input parameter combinations, or the optimum dynamic output parameter combination. The algorithm starts with an initial guess, which may be based on the optimum dynamic output parameter combination inferred from offset wells. The optimization algorithm performs multiple iterations, where each iteration involves a proposed dynamic input parameter combination, evaluated by the blackbox to compute the objective function and constraints at that given dynamic input parameter combination.

The optimization algorithm should be sufficiently robust that in converges fast without getting stuck in local optima (i.e., suboptimal dynamic input parameter combination). Multiple derivative-free algorithms may be used to solve the blackbox optimization problem at hand. Derivative-free optimization solvers that may be used are Bayesian optimization, evolution strategies, Nelder-Mead method, simulated annealing, genetic algorithms, particle swarm optimization, ant colony optimization, among others.

To further define the blackbox, it is important to highlight that both ROP and RCD (118) wear are controlled by weight of bit (WOB), rotary speed (RPM), and pump flow rate (GPM). The instantaneous ROP is a direct reactive quantity that is measured onsite for any optimum dynamic output parameter combinations. Similarly, these optimum dynamic output parameter combinations affect the sensor readings, which in turn allow for evaluating and/or forecasting the RCD (118) wear/longevity based on the elements which are most likely to fail first.

Let ROP(x) and RCD(x) be the rate of penetration and rotating control device wear, respectively, at a given point x=(WOB, RPM, GPM). With this general setup, multiple variations may be used to fully configure the blackbox optimization problem at hand. The first example is a multi-objective, constrained optimization. In this case, m=2 and p=0 where, m is the number of inequality constraints and p is the number of equality constraints for the optimization. A multi-objective function may be defined as:

$$f(x)=f(ROP(x),RCD(x)) \quad \text{Equation (2)}$$

This represents some combination of ROP and RCD (118) to be optimized. In a maximization setting, this multi-objective function may take many forms including the following two examples, the first being a multi-objective, constrained optimization;

$$f(x) = \frac{ROP(x)}{RCD(x)} \quad \text{Equation (3)}$$

OR $$f(x) = \alpha ROP(x) - \beta RCD(x) \text{ for } \alpha, \beta > 0 \quad \text{Equation (4)}$$

Where $\alpha$ and $\beta$ refer to the coefficients used to assign different weights and prioritize the ROP over the RCD wear or vice versa.

These methods or objective functions described by Equation (3) and Equation (4) allow for prioritizing the importance of ROP over RCD (118) wear or vice versa as desired by the drilling engineering and the operation stakeholders. While this setup could include many constraints related to drilling troubles (equipment torsional thresholds, drilling bit weight limits, hole cleaning requirements, etc.), it must at least involve two inequality constraints to eliminate kick and lost circulation occurrence.

Pore Pressure Constraint (Note the Negative Sign is Used to Flip the Inequality)
    $g_1$=dynamic or static bottomhole pressure and $C_1$=−pore pressure
Fracture Pressure Constraint:
    $g_2$=dynamic or static bottomhole pressure and $C_2$=fracture pressure
Optimum Dynamic Output Parameter Combination:

$$x_{opt}=(WOB_{opt},RPM_{opt},GPM_{opt})$$

The second example is a single-objective, constrained optimization. In this case, let us configure m=3 and p=0 where, m is the number of inequality constraints and p is the number of equality constraints for the optimization. A multi-objective function may be defined as:

$$f(x)=ROP(x). \quad \text{Equation (5)}$$

The constraints in this case would be:
Pore Pressure Constraint (Note the Negative Sign is Used to Flip the Inequality)
    $g_1$=dynamic or static bottomhole pressure and $C_1$=−pore pressure
Fracture Pressure Constraint:
    $g_2$=dynamic or static bottomhole pressure and $C_2$=fracture pressure
    $g_3$=RCD(x)=RCD seal and bearing wear rate
    $C_3$=predefined wear rate threshold
Optimum Dynamic Output Parameter Combination:

$$x_{opt}=(WOB_{opt},RPM_{opt},GPM_{opt})$$

In Step 410, and in accordance with one or more embodiments, the optimized average ROP is executed, at the wellsite, using the optimum dynamic output parameter combination for the drilling operation. This is done by modifying the wellsite controllable parameters to match the values of the solved optimum dynamic output parameter combination. As previously discussed, the optimum dynamic output parameter combination consists of the wellsite adjustable parameters of weight on bit, rotary speed, and pump flow rate. This method to optimize the average ROP is a real-time optimization and may be performed multiple times during a drilling operation as conditions are continuously changing.

Figure 5:
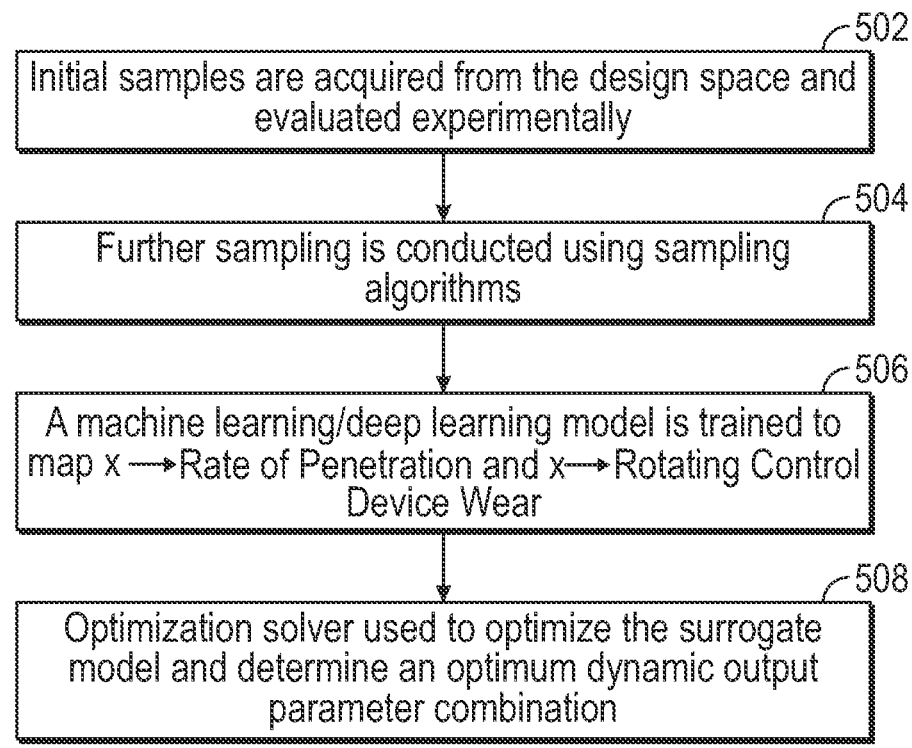
FIG. 5 shows a flowchart in accordance with one or more embodiments.

FIG. 5 shows a flowchart describing the surrogate-based optimization method, in accordance with one or more embodiments. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In cases, where the physics-based estimates need to be calibrated for individual operations, and/or when it is desired to develop surrogate or proxy models that resemble ROP(x) and/or RCD(x), a surrogate-based optimization using ML or DL surrogate models may be used in accordance with one or more embodiments. The surrogate-based optimization method may be used to forecast RCD (118) wear and solve for the optimum dynamic output combination.

In Step 502 initial samples are acquired from the design space using knowledge based and space filling techniques and evaluated experimentally. The initial samples include initial dynamic input parameter combination values and may be obtained initially from an offset well. These initial values are then evaluated experimentally in the field by setting the weight on bit, rotary speed, and pump flow rate to these values where ROP and RCD (118) wear are observed and estimated, respectively. The experimental field tests give a more accurate RCD (118) wear and may improve on initial sample values. The sampling process may be repeated in combination with the experimental field tests until a certain criterion is achieved.

In Step 504 further sampling is conducted using sampling algorithms. A sampling algorithm is a procedure that allows a subset of units (a sample) to be randomly selected from a population without enumerating all the possible samples of the population. In this case, the samples compose of dynamic input parameter combinations. These sampling algorithms may consist of random, space-filling, and adaptive techniques and may be used to capture the more nonlinear regions of the design space.

The experimental field testing and reinforced sampling processes are repeated until a defined loss function exceeds a given set of criteria. A loss function is a method of evaluating how well your initial samples model your observed and estimated ROP and RCD (118) wear. Once the dynamic input parameter combination values pass the given set of criteria, the optimization may proceed to surrogate training. If the given set of criteria is not met, then further sampling and experimenting may be performed until the defined loss function exceeds given set of criteria.

In Step 506, and in accordance with one or more embodiments, a ML/DL model is trained to map x→ROP and x→RCD wear. For this, anomaly detection (e.g., principal component analysis, clustering, 1-class models, etc.), regression (e.g., artificial neural networks, convolutional neural networks, etc.), or multi-class classification models (e.g., random forest, support vector machine, etc.) may be used to identify the relationship of dynamic and static parameters for a given operation and the state of the RCD (118) equipment and ROP performance. The output of such models may be numerical or categorical and may be evaluated for criteria acceptance. If the given set of criteria is not met, then further ML/DL modeling may be performed until a certain criterion is met.

In Step 508, and in accordance with one or more embodiments, an optimization solver is used to optimize the surrogate model and determine an optimum dynamic output parameter combination. This surrogate-based optimization method provides a data-driven proxy of ROP and RCD (118) besides giving the optimal point. Both the surrogate-based optimization method and the method estimating RCD(x) based on either physics-based static and dynamic calculations or ML/DL estimations using historical or real-time data, require one or more stoppage criteria (e.g., maximum allowable iterations, surrogate prediction power, uncertainty) to decide when the optimum dynamic output parameter combination is achieved with a sufficient level of certainty.

Figure 6:
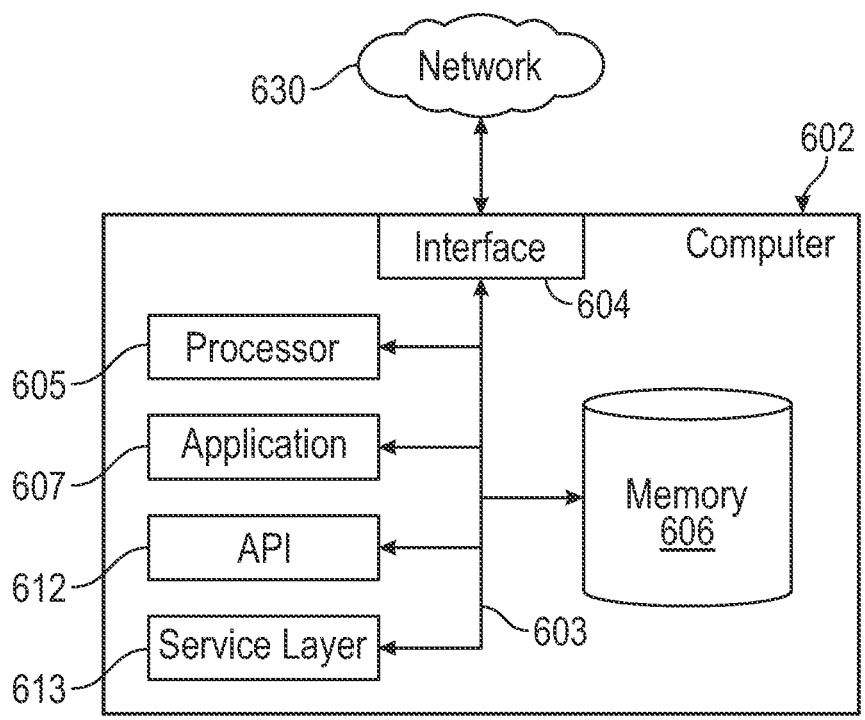
FIG. 6 shows a system in accordance with one or more embodiments.

FIG. 6 depicts a block diagram of a computer system (602) used to provide computational functionalities associated with described algorithms, methods, functions, processes, flows, and procedures as described in this disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that may accept user information, and an output device that conveys information associated with the operation of the computer (602), including digital data, visual, or audio information (or a combination of information), or a GUI.

The computer (602) may serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) may receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) may communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602).

The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a non-transitory computer (602) readable medium, or a memory (606), that holds data for the computer (602) or other components (or a combination of both) that may be connected to the network (630). For example, memory (606) may be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) may be external to the computer (602).

The application (607) is an algorithmic software engine providing functionality according to particular needs, desires, or particular implementations of the computer (602), particularly with respect to functionality described in this disclosure. For example, application (607) may serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) may be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for a well, the method comprising:
    obtaining, using a computer processor, a dynamic input parameter combination for the well, wherein a closed loop drilling operation is configured to be performed on the well using a closed loop drilling system comprising a drill pipe disposed in the well and a rotating control device configured to form a pressure seal around the drill pipe using an element;
    determining, using the computer processor, measurements for the rotating control device using a sensor;
    determining rotating control device estimation methods using a physics-based machine learning algorithm comprising a surrogate-based optimization by acquiring and evaluating a dynamic input parameter combination sample;
    predicting, using the computer processor, a rotating control device wear estimate using the rotating control device estimation methods, the measurements, and the dynamic input parameter combination;
    maximizing, using the computer processor, an instantaneous rate of penetration, while reducing rotating control device failure, to determine an optimized average rate of penetration using the rotating control device wear estimate; and
    automatically sending a control signal to the closed loop drilling system to rotate the drill pipe disposed in the well at the optimized average rate of penetration while forming a pressure seal around the rotating drill pipe using the element of the rotating control device when the instantaneous rate of penetration is maximized to determine the optimized average rate of penetration.

2. The method of claim 1, wherein obtaining, using the computer processor, the dynamic input parameter combination for the well further comprises selecting two or more parameters from a list comprising: weight on bit, rotary speed, pump flow rate, torque, standpipe pressure, mud properties, formation lithology, hole size, drilling bit design, bottom-hole assembly, drilling mud type, and offset well parameters.

3. The method of claim 1, wherein determining, using the computer processor, the measurements for the rotating control device using the sensor further comprises obtaining one or more measurements selected from a list comprising: pipe eccentricity, rotation, housing temperature, coolant temperature, pressure, noise, vibration, erosion, image, and video.

4. The method of claim 1, wherein determining the rotating control device estimation methods using the physics-based machine learning algorithm comprising the surrogate-based optimization further comprises training the physics-based machine learning algorithm to map the instantaneous rate of penetration and the rotating control device wear estimate using anomaly detection, regression, or multi-class classification models.

5. The method of claim 1, wherein maximizing, using the computer processor, the instantaneous rate of penetration, while reducing rotating control device failure, to determine the optimized average rate of penetration further comprises determining an optimum dynamic output parameter combination.

6. The method of claim 5, wherein determining the optimum dynamic output parameter combination further comprises, forming an objective function using a blackbox optimization method.

7. The method of claim 6, wherein forming the objective function using the blackbox optimization method further comprises, finding a solution of the objective function using a derivative free optimization solver wherein the solution comprises the optimum dynamic output parameter combination.

8. A non-transitory computer readable medium storing instructions for a well, the instructions being executable by a computer processor and comprising functionality for:

obtaining, using a computer processor, a dynamic input parameter combination for the well, wherein a closed loop drilling operation is configured to be performed on the well using a closed loop drilling system comprising a drill pipe disposed in the well and a rotating control device configured to form a pressure seal around the drill pipe using an element;

determining, using the computer processor, measurements for the rotating control device using a sensor;

determining rotating control device estimation methods using a physics-based machine learning algorithm comprising a surrogate-based optimization by acquiring and evaluating a dynamic input parameter combination sample;

predicting, using the computer processor, a rotating control device wear estimate using the rotating control device estimation methods, the measurements, and the dynamic input parameter combination;

maximizing, using the computer processor, an instantaneous rate of penetration, while reducing rotating control device failure, to determine an optimized average rate of penetration using the rotating control device wear estimate; and automatically sending a control signal to the closed loop drilling system to rotate the drill pipe disposed in the well at the optimized average rate of penetration while forming a pressure seal around the rotating drill pipe using the element of the rotating control device when the instantaneous rate of penetration is maximized to determine the optimized average rate of penetration.

9. The non-transitory computer readable medium of claim 8, wherein obtaining, using the computer processor, the dynamic input parameter combination for the well further comprises selecting two or more parameters from a list comprising: weight on bit, rotary speed, pump flow rate, torque, standpipe pressure, mud properties, formation lithology, hole size, drilling bit design, bottom-hole assembly, drilling mud type, and offset well parameters.

10. The non-transitory computer readable medium of claim 8, wherein determining, using the computer processor, the measurements for the rotating control device using the sensor further comprises obtaining one or more measurements selected from a list comprising: pipe eccentricity, rotation, housing temperature, coolant temperature, pressure, noise, vibration, erosion, image, and video.

11. The non-transitory computer readable medium of claim 8, wherein determining the rotating control device estimation methods using the physics-based machine learning algorithm comprising the surrogate-based optimization further comprises training the physics-based machine learning algorithm to map the instantaneous rate of penetration and the rotating control device wear estimate using anomaly detection, regression, or multi-class classification models.

12. The non-transitory computer readable medium of claim 8, wherein maximizing, using the computer processor, the instantaneous rate of penetration, while reducing rotating control device failure, to determine the optimized average rate of penetration further comprises determining an optimum dynamic output parameter combination.

13. The non-transitory computer readable medium of claim 12, wherein determining the optimum dynamic output parameter combination further comprises, forming an objective function using a blackbox optimization method.

14. The non-transitory computer readable medium of claim 13, wherein forming the objective function using the blackbox optimization method further comprises finding a solution of the objective function using a derivative free optimization solver wherein the solution comprises the optimum dynamic output parameter combination.

* * * * *